United States Patent
Maeno et al.

(10) Patent No.: US 6,946,085 B2
(45) Date of Patent: Sep. 20, 2005

(54) PYROCHLORE IRIDATES HAVING METALLIC CONDUCTIVITY AND THEIR PRODUCTION METHOD

(75) Inventors: Yoshiteru Maeno, Kyoto (JP); Daiki Yanagishima, Kyoto (JP)

(73) Assignee: Japan Science and Technology Agency, Kawaguchi (JP)

( * ) Notice: Subject to any disclaimer, the term of this patent is extended or adjusted under 35 U.S.C. 154(b) by 187 days.

(21) Appl. No.: 10/362,762

(22) PCT Filed: Aug. 23, 2001

(86) PCT No.: PCT/JP01/07234

§ 371 (c)(1),
(2), (4) Date: Feb. 28, 2003

(87) PCT Pub. No.: WO02/18274

PCT Pub. Date: Mar. 7, 2002

(65) Prior Publication Data
US 2003/0173549 A1 Sep. 18, 2003

(30) Foreign Application Priority Data
Aug. 30, 2000 (JP) ........................ 2000-260319

(51) Int. Cl.$^7$ ............................ H01B 1/08; C01G 55/00
(52) U.S. Cl. ................. 252/518.1; 252/62.51; 335/296; 335/148; 335/158
(58) Field of Search ............... 252/518.1, 62.51; 335/296; 365/148, 158

(56) References Cited

U.S. PATENT DOCUMENTS 5,828,164 A * 10/1998 Branovich et al. ...... 313/346 R

FOREIGN PATENT DOCUMENTS

| JP | A 3-13599 | 1/1991 |
| JP | 6-244469 | 9/1994 |
| JP | A 9-92536 | 4/1997 |
| JP | A 9-214018 | 8/1997 |

OTHER PUBLICATIONS

Kennedy, "Structural trends in pyrochlore–type oxides", Physica B, Aug. 1997, vols. 241–243, pp. 303–310.
Ashcroft et al., "An In Situ Study of Pyrochlore–type Catalysts for the Formation of Synthesis Gas from Methane and CO2", R. Soc. Chem, (1992), vol. 114, (Catalysis and Surface Characterization), pp. 184–189.
Ten Kortenaar et al., "Oxygen evolution and reduction on iridium oxide compounds", J. Power Sources, (1995), vol. 56, pp. 51 to 60.
Harris et al., "Geometrical Frustration in the Ferromagnetic Pyrochlore $Ho_2Ti_2O_7$", Physical Review Letters, (1997), vol. 79, No. 13, pp. 2554–2557.
Gingras et al., "Static Critical Behavior of the Spin–Freezing Transition in the Geometrically Frustrated Pyrochlore Anti-ferromagnet $Y_2Mo_2O_7$", Physical Review Letters, (1997), vol. 78, pp. 947–950.
Ramirez et al., Zero–point entropy in "spin ice", Nature, (1999), vol. 399, pp. 333–335.

* cited by examiner

Primary Examiner—Mark Kopec
(74) Attorney, Agent, or Firm—Oliff & Berridge, PLC

(57) ABSTRACT

The present invention was made to develop a new material possessing simultaneously the two properties of geometrically frustrated state having a magnetic controllability and good conductivity which leads to applications for electrical controllability and thermal storage. This object is achieved by the conductive material having the pyrochlore structure represented by the general formula $R_2Ir_2O_7$, where R is a rare earth element or elements of La, Ce, Pr, Nd, Pm, Sm, Eu, Gd, Tb, Dy, Ho, Er, Tm, Yb, Lu and Y. When, especially, R is an element or elements of La, Ce, Pr, Nd, Pm, Sm and Eu, the material possesses metallic electrical conductivity, so that it is useful for magnetically controllable functional electronic materials and thermal storage materials having large thermal capacity.

8 Claims, 4 Drawing Sheets

(a)

(b)

Specific Heat

Pr$_2$Ir$_2$O$_7$

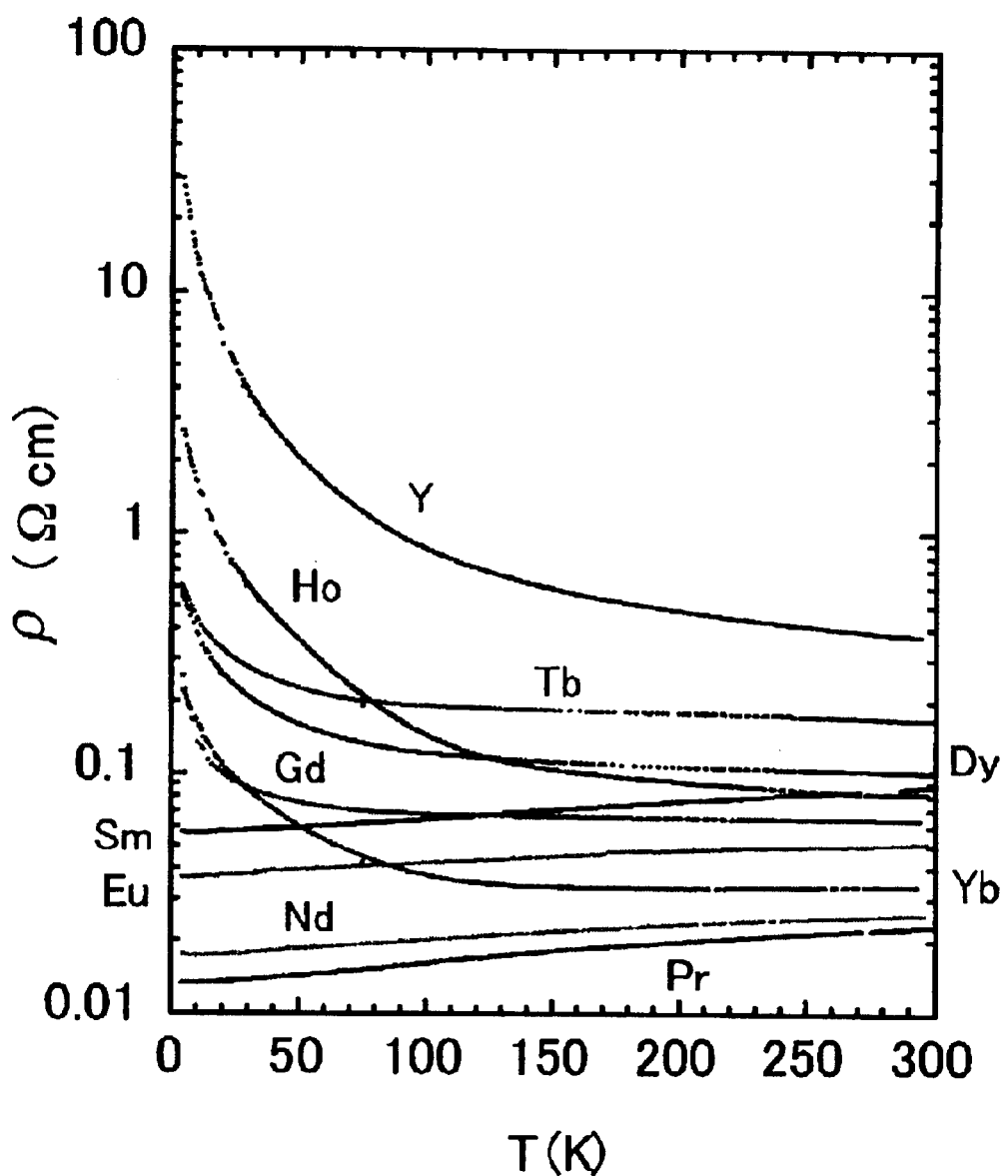

PYROCHLORE IRIDATES HAVING METALLIC CONDUCTIVITY AND THEIR PRODUCTION METHOD

FIELD OF THE INVENTION

The present invention relates to an electronic functional material using the interaction between magnetic ions and electric conduction electrons in a crystal, and also to a thermal storage material having high thermal conductivity and large thermal capacity in a wide range of temperatures.

BACKGROUND ART

Conventional electronic functional materials using the interaction between magnetic ions and electric conduction electrons in a solid include various magnetic memory elements and giant magnetoresistive elements. The magnetic states of those functional materials are the long range ordered states in which they are energetically stable under given circumstances.

When the interaction between the geometrical arrangement of the magnetic elements on the lattice sites and the magnetic moments (or spins) of the magnetic elements satisfies a certain condition, the spin arrangement is not determined unique but many states having the same energy level degenerate even in the proximity of the absolute zero temperature. This situation is termed as "geometrical frustration".

In that case, though, the degenerated states separate again when an external effect, such as an external magnetic field, is applied. This means that the magnetic state of the crystal can be controlled by applying an external effect such as an external magnetic field. Also, in that case, it is known that other quantum effects such as an anomalous Hall effect due to a local magnetic field may occur.

On the other hand, the crystal field effect is also important due to the coupling of orbital angular momenta and spins of electrons. Owing to this effect, energy levels can be changed by a magnetic field, which means that the magnetic states of a crystal can be controlled.

In oxides having the pyrochlore structure as shown in FIG. 1, the three-dimensional network of corner-sharing tetrahedra (with an O atom at the corner) causes geometrical frustration when magnetic elements R exist at the corners. When rare earth elements are used in this case, the crystal field effect is also important. That is, both the geometrical frustration and the crystal field effect characterize the system.

In some oxides having the pyrochlore structure, the geometrical frustration is also called as "spin ice", because of the analogy in the spin arrangement of oxygen-magnetic ion system to the spatial arrangement of the oxygen hydrogen system in water ice (M. J. Harris et al., Phys. Rev. Lett. 79, 2554–2557 (1997)).

Known compounds of such kind include Ti pyrochlore oxides (e.g., $Ho_2Ti_2O_7$: M. J. Harris et al., ibid; $Dy_2Ti_2O_7$: A. R. Ramirez, Nature 399, 333–335 (1999)) and Sn pyrochlore oxides. But these oxides are insulators, so that the practical use or application to electrical functional elements are quite limited.

Among Mo- (e.g., $Y_2Mo_2O_7$: M. J. P. Gingras et al., Phys. Rev. Lett. 78, 947–950 (1997)), Mn- and Ru-pyrochlore oxides, some are electrically conductive, but they develop well known magnetically ordered states such as the spin-glass ordering or antiferromagnetic ordering due to disorders contained in those materials or due to the structural phase transition, so that the large specific heat that should develop when the geometrical frustration exists does not appear.

As explained above, the state containing the geometrical frustration can be called as a "magnetic state containing controllability" in the sense that the magnetic state can be controlled by applying an external magnetic field. In that case, though, its application to industrial use is practically quite limited if it is not associated with some device for controlling it or with some sensor for detecting the magnetic state. Thus, for the purpose of industrial application, it is desired to develop a material which can show the spin ice state, or similar state, and has a good electrical conductivity.

It is another advantage that such a material that develops no magnetic transition to long range ordered magnetic state down to low temperatures has a large specific heat in a wide range of temperature. When such a material is intended to be used for a thermal storage material, it is strongly desired to have a large thermal conductivity to exchange heat with peripheral devices. From this point also it is desired to have a good conductivity or to be metal, rather than an insulator.

DISCLOSURE OF THE INVENTION

The inventors of the present invention have developed a new material possessing the two useful qualities simultaneously: one that shows the magnetically controllable state containing the geometrical frustration, and the other that shows a good conductivity which leads to electrical controllability and an application to thermal storage.

According to the present invention, the new material is the pyrochlore iridates (oxides) having metallic conductivity represented by the general formula $R_2Ir_2O_7$, where R is an element or elements selected from the group of La, Ce, Pr, Nd, Pm, Sm, Eu, Gd, Tb, Dy, Ho, Er, Tm, Yb, Lu and Y.

BRIEF DESCRIPTION OF THE DRAWINGS

FIG. 5 is a graph showing the relationship between the temperature and the electrical resistivity of various pyrochlore iridate oxides according to the present invention.

BEST MODE FOR CARRYING OUT THE INVENTION

The pyrochlore iridate oxides are represented by $R_2Ir_2O_7$, in which materials with Pb and Bi, both having no magnetic moment, as R are known so far. Also known is that $Eu_2Ir_2O_7$ can be synthesized, but it has been only known that $Eu_2Ir_2O_7$ is electrically conductive above the room temperature (R. J. Bouchard and J. L. Gillson, Mat. Res. Bull. 6, 669–680 (1971)). The material of the present invention uses, as R, one or a combination of elements from the group of rare earth elements, i.e., lanthanum (La, 57), cerium (Ce, 58), praseodymium (Pr, 59), neodymium (Nd, 60), promethium (Pm, 61), samarium (Sm, 62), europium (Eu, 63), gadolinium (Gd, 64), terbium (Tb, 65), dysprosium (Dy, 66), holmium (Ho, 67), erbium (Er, 68), thulium (Tm, 69), ytterbium (Yb, 70), lutetium (Lu, 71) and yttrium (Y, 39) (numbers in the parentheses are atomic numbers).

Figure 1:
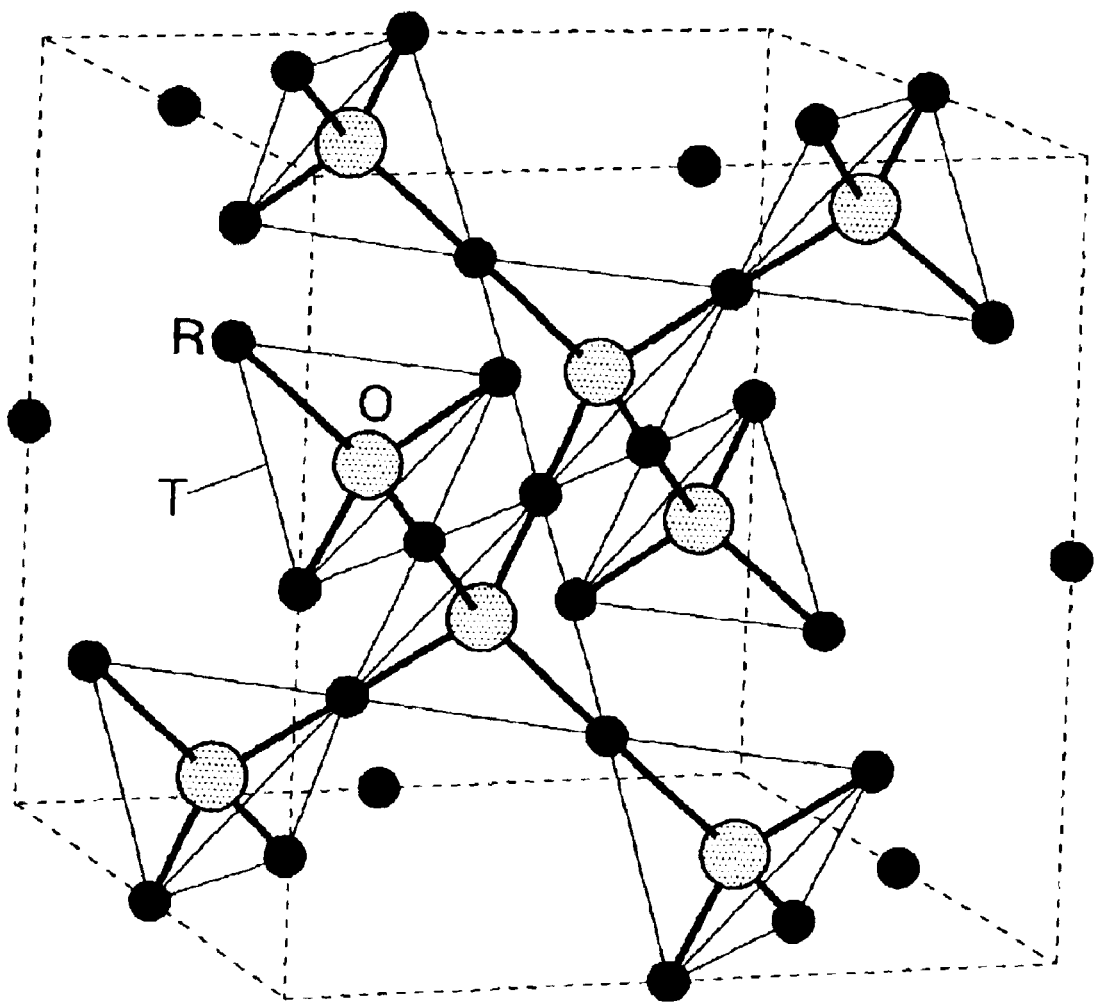
FIG. 1 is an atom-ion configuration diagram of the pyrochlore structure.
Figure 2:
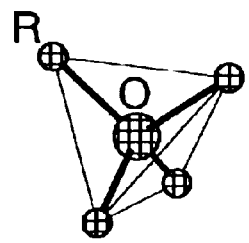
FIG. 2($a$) is a tetrahedron composed of an oxygen atom and ions of rare earth elements R, and FIG. 2($b$) is an octahedron composed of an iridium and oxygen atoms, both drawn out from the $R_2Ir_2O_7$ pyrochlore oxide according to the present invention.
Figure 2:
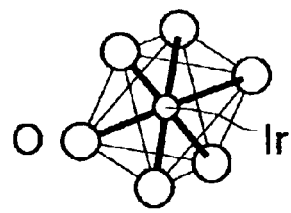
Figure 3:
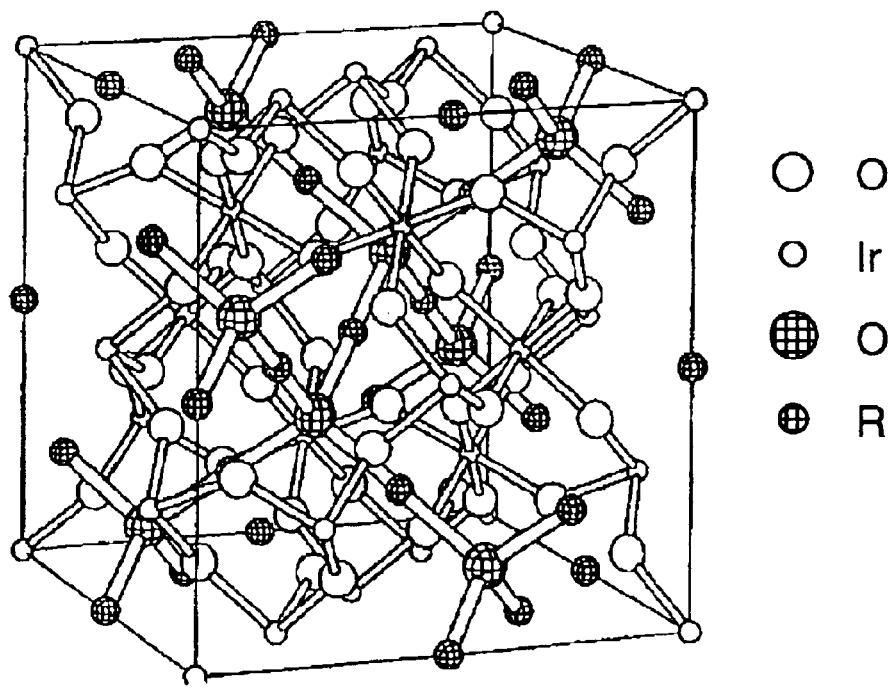
FIG. 3 is an atom-ion configuration diagram of the $R_2Ir_2O_7$ pyrochlore oxide according to the present invention.

Generally, rare earth elements are stable in the compounds of oxidation number three, and the ions have magnetic moment and show paramagnetism, except in the case of $La^{3+}$, $Ce^{4+}$, $Lu^{3+}$, $Yb^{2+}$ or $Y^{3+}$, which are diamagnetic ("Dictionary of Physics and Chemistry 5th Ed.", Iwanami, 1998). In the $R_2Ir_2O_7$ pyrochlore oxides of the present invention, the corners of the tetrahedra centering O are occupied by the rare earth trivalent ions (FIG. 2(a), $R_2O$), and the octahedra composed of Ir and O are interpolated among them (FIG. 2(b), $IrO_3 \times 2 = Ir_2O_6$). Thus the crystal structure is shown by FIG. 3.

Figure 4:
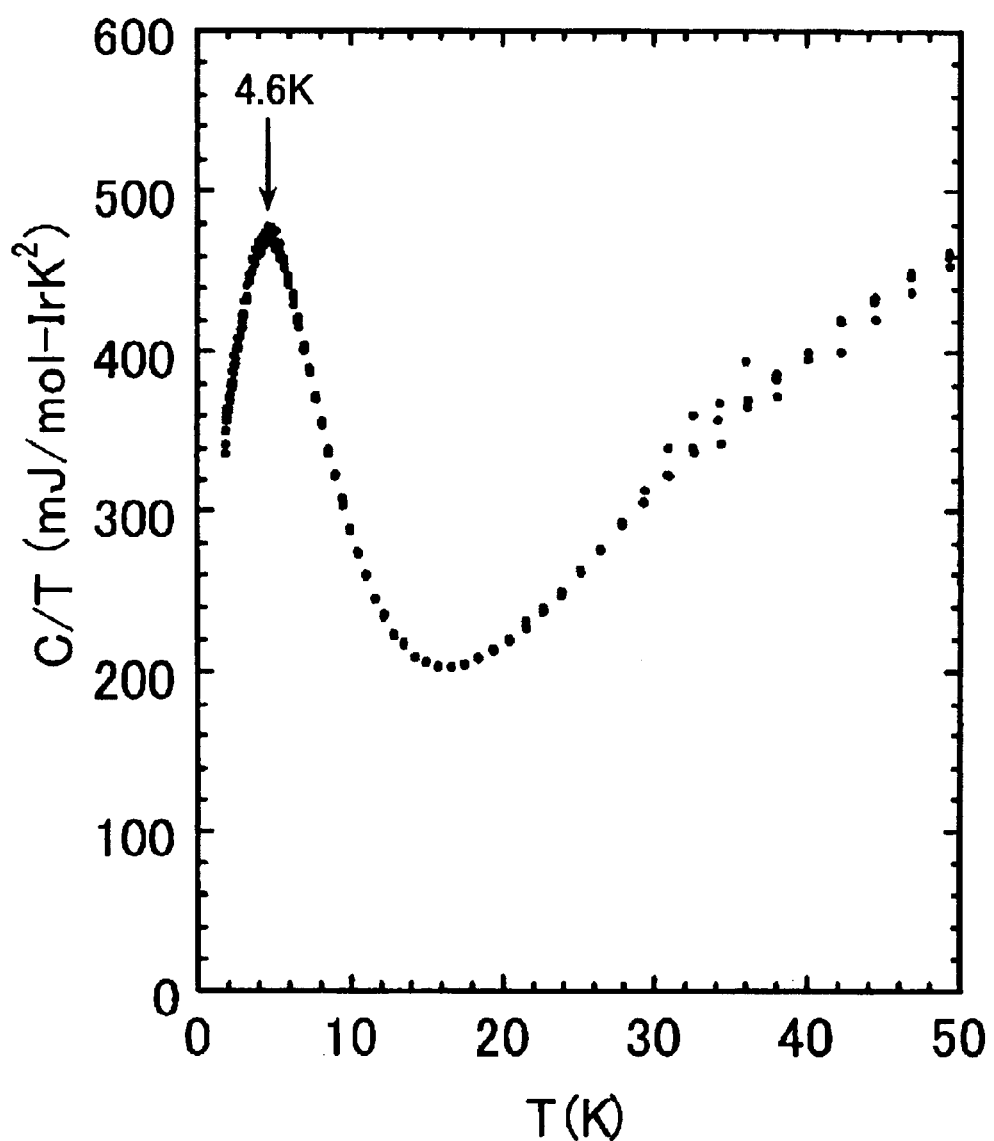
FIG. 4 is a graph showing the relationship between the temperature and the specific heat of a pyrochlore oxide $Pr_2Ir_2O_7$ according to the present invention.

The magnetic properties of those materials in the temperature range from the room temperature down to 10K can be explained well by the local magnetism due to the $R^{3+}$ ions. From the measurements of magnetic properties and specific heat (FIG. 4) in further lower temperature range on $Pr_2Ir_2O_7$ which is a material of the present invention, $Pr_2Ir_2O_7$ shows a moderate peak in the specific heat which is apparently characteristic to the crystal field effect.

In a state having a magnetic frustration, a plurality of states having the same energy provides degeneracy. When a disturbance, such as an external magnetic field of a certain direction, is applied to the state, the energy levels of the states differ and the degeneracy is lifted. In this case, the magnetic state of the material becomes different from that before the external magnetic field or the like is applied. By using some means for detecting it, the material can be used as an electronic functional material such as a switch or memory. Since the intensity of the external magnetic field necessary to break the degeneracy is generally very small, the magnetic device using the material of the present invention can have a very high sensitivity.

As shown in FIG. 5, when the ionic radius is relatively large such as in the case of Pr, Nd, Sm and Eu, the materials of the present invention exhibit metallic conductivity, where the electrical resistivity lowers as the temperature decreases. When, therefore, those rare earth elements are used as R (generally, La, Ce, Pr, Nd, Pm, Sm and Eu having smaller atomic numbers than Gd (64) except Y (39)), the materials of the present invention develop metallic conductivity, and provide possibility of application to the use as electronic functional material or thermal storage material.

When the ionic radius is relatively small (Gd, Tb, Ho, Yb and Y in FIG. 5. Generally, Gd, Tb, Dy, Ho, Er, Tm, Yb and Lu having the atomic number larger than Eu (63)), they show non-metallic conductivity in which the electrical resistivity increases as the temperature decreases. But in those cases, the actual value of the electrical resistivity is close to that of metals, so that they are classified to be materials of good conductivity.

In the materials of the present invention, the electrical conduction is performed mainly by the tetravalent iridium ions $Ir^{4+}$. The transition between metal and non-metal is attributable to the widening of the energy gap by the electron correlation effect resulting from the decrease in the width of the conduction band, which is caused by the distorsion of crystal lattice due to the small $R^{3+}$ ions.

The synthesizing method of the materials of the present invention using rare earth elements R is as follows. The starting materials of oxides $R_nO_m$ (where n and m are integers) and $IrO_2$ were mixed in the stoichiometric ratio of R and Ir, and heated in air at temperatures ranging from 700C. to 1100C. (preferably from 800C. to 950C.) for four days. It is important to grind and mix it well every two days. Since $IrO_2$ tends to sublimate, it is preferable to add some excess of it before or during the reaction for synthesizing purer materials.

The materials (oxides) of the present invention can be used as a magnetically controllable electronic functional materials having a good electrical and thermal conductivity in a powdered state or in powdered-and-sintered state. It is also possible to grow their single crystals by a floating-zone technique, in which case the advantageous properties are expected to develop intensely, and it is also expected that they are used as strong magnetic materials or electronic functional materials.

According to the present invention, as described above, using $R_2Ir_2O_7$ pyrochlore oxides composed of rare earth elements R and transition metal element Ir, such a quantum state has been realized that possesses both highly controllable magnetic state including geometrical frustration and metallic or non-metallic good electrical conductivity. The material of the present invention can be used in such applications as magnetic switching element which makes use of the strong magnetic controllability susceptible even to faint external magnetic field, or magnetic memory element. An application to electronic functional material is also possible using the quantum effect such as the anomalous Hall effect which does not need an external magnetic field. Further it is expected to lead to the development of superconductive material having an internal magnetic field and its applications.

The pyrochlore iridate oxides $R_2Ir_2O_7$ of the present invention have a large thermal capacity in a wide range of temperature at low temperatures. Some of them exhibit metallic properties so that they also have high thermal conductivity. Owing to these properties, the metallic materials according to the present invention and materials composed mainly of those materials are expected to be applied to thermal storage materials necessary for cryocoolers or the like.

What is claimed is:

1. A magnetic sensor used below the temperature of 10K wherein it uses a magnetically controllable pyrochlore material having electrical conductivity represented by a general formula $R_2Ir_2O_7$, where R is an element or elements selected from the group consisting of La, Ce, Pr, Nd, Pm, Sm and Eu.

2. A magnetic sensor used below the temperature of 10K wherein it uses a magnetically controllable pyrochlore material according to claim 1, wherein R consists of Pr.

3. A magnetic switching element used below the temperature of wherein it uses a magnetically controllable pyrochlore material having electrical conductivity represented by a general formula $R_2Ir_2O_7$, where R is an element or elements selected from the group consisting of La, Ce, Pr, Nd, Pm, Sm and Eu.

4. A magnetic switching element used below the temperature of 10K wherein it uses a magnetically controllable pyrochlore material according to claim 3, wherein R consists of Pr.

5. A magnetic memory element used below the temperature of 10K wherein it uses a magnetically controllable pyrochlore material having electrical conductivity represented by a general formula $R_2Ir_2O_7$, where R is an element or elements selected from the group consisting of La, Ce, Pr, Nd, Pm, Sm and Eu.

6. A magnetic memory element used below the temperature of 10K wherein it uses a magnetically controllable pyrochlore material according to claim 5, wherein R consists of Pr.

7. A thermal storage element for cryocoolers wherein it uses a magnetically controllable pyrochlore having electrical conductivity represented by a general formula $R_2Ir_2O_7$, where R is an element or elements selected from the group consisting of La, Ce, Pr, Nd, Pm, Sm and Eu.

8. A thermal storage element for cryocoolers wherein it uses a magnetically controllable pyrochlore material according to claim 7, wherein R consists of Pr.

* * * * *